Nov. 21, 1939.      W. R. WILSON      2,180,652
EYE TESTING INSTRUMENT
Filed Aug. 17, 1937      3 Sheets-Sheet 1
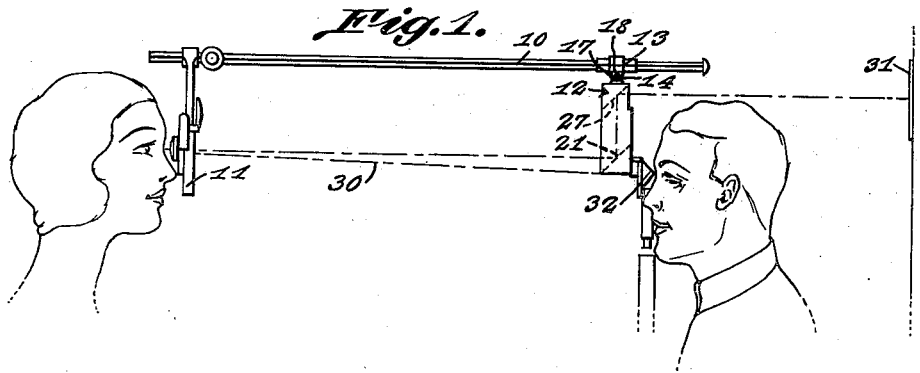
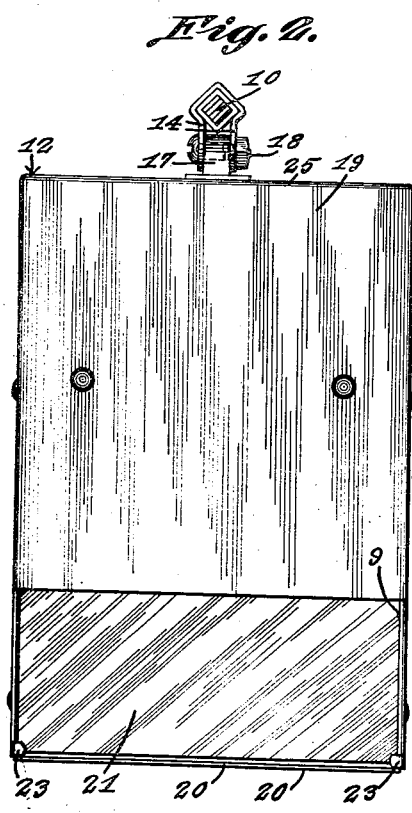
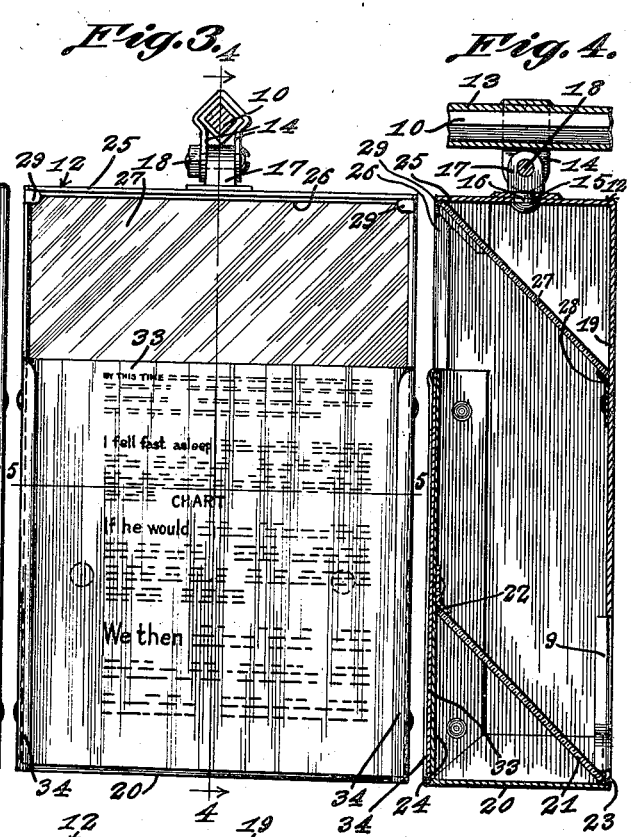
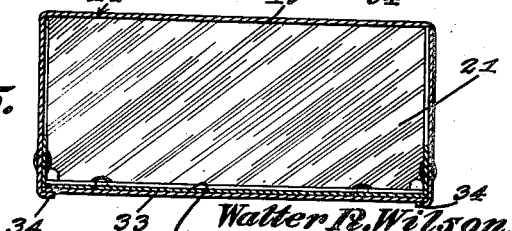
Walter R. Wilson, INVENTOR

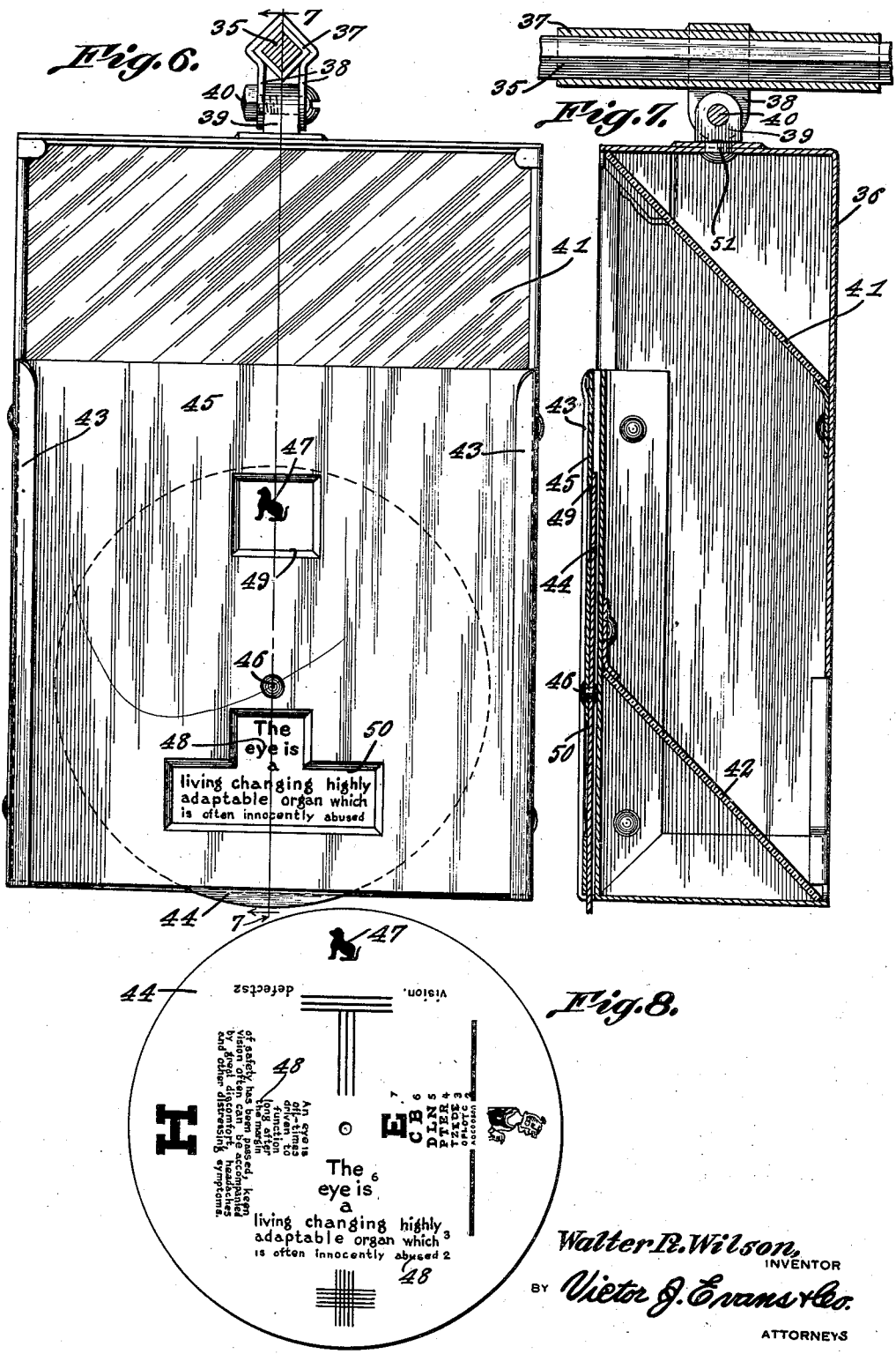

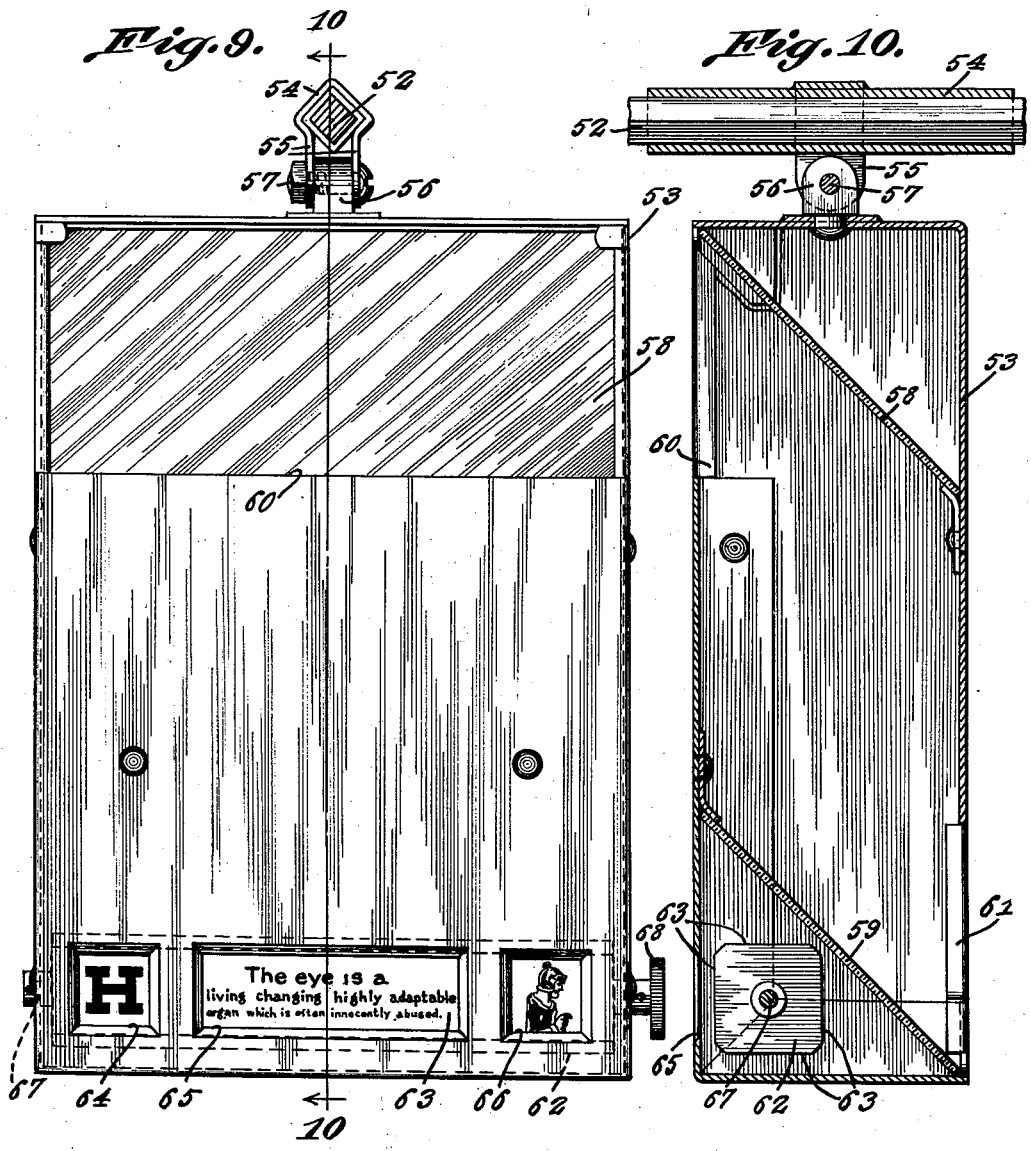

Patented Nov. 21, 1939

2,180,652

UNITED STATES PATENT OFFICE 2,180,652

EYE TESTING INSTRUMENT

Walter R. Wilson, Douglas, Ga.

Application August 17, 1937, Serial No. 159,563

1 Claim. (Cl. 88—20)

This invention relates to eye testing instruments and has for an object to provide novel means for positioning and holding two mirrors angled in such a manner as to permit the examination of the eye for refractive errors under normal conditions.

A further object is to provide a combined periscope and chart which will be in compact form and may be readily adjusted to permit of greater comfort to the patient than previous devices, and which will at all times permit the scopist to view the open complete eye of the patient.

A further object is to provide a device of this character which will permit a complete retinoscopic examination of the eyes without the scopist interrupting the line of vision of the patient and which will promote the necessary coordination between accommodation, that is, the regulation of the focus of the eye for both far and near objects, and convergence, that is, the turning of the eyes inward to a point, and thus prevent spasms of accommodation and consequent erroneous findings in the examination analysis.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a side elevation of an eye testing instrument constructed in accordance with the invention and showing the same in applied position for use in testing the eyes.

Figure 2 is a front elevation of the device.

Figure 3 is a rear elevation of the device.

Figure 4 is a longitudinal sectional view of the device taken on the line 5—5 of Figure 3.

Figure 5 is a cross sectional view of the device taken on the line 5—5 of Figure 3.

Figure 6 is a rear elevation of a modified form of the invention showing a rotatable disc chart and showing sight openings in the face plate of the chart to expose certain characters, legends and the like.

Figure 7 is a longitudinal sectional view taken on the line 7—7 of Figure 6.

Figure 8 is a front elevation of the chart showing characters and legends of the disc chart.

Figure 9 is a rear elevation of another modified form of the invention showing a roller chart and showing sight openings in the wall of the casing to expose certain characters, legends and the like.

Figure 10 is a longitudinal sectional view taken on the line 10—10 of Figure 9.

Figure 11 is a front elevation of the roller chart removed from the casing.

Referring now to the drawings in which like characters of reference designate similar parts in the various views, 10 designates a stationary supporting rod of substantially rectangular shape in cross section and upon this rod the lensed instrument 11 through which the patient directs the vision, is supported.

In carrying out the invention a substantially rectangular casing 12 forming a combined periscope and chart holder is swivelly and adjustably mounted on the rod 10. To mount the device a sleeve 13 of substantially rectangular cross section is slidably fitted on the rod 10 and is equipped on the underneath side with hinge ears 14. The casing 12 is provided in the top with an opening 15 which receives a pin 16 which forms a vertical axis of rotation for the casing so that either the front or the back of the casing may be disposed toward the patient.

The pin is provided with hinge ears 17 which are interleaved with the hinge ears 14 of the sleeve 13. A hinge pintle 18 is passed through the interleaved ears. The casing may be swung backwardly and forwardly on the hinge pintle as a horizontal axis to vary the angular inclination of the casing with respect to the horizontal. The casing may also be moved longitudinally of the rod 10 by moving the sleeve 13 to adjusted positions thereon to vary the distance between the scopist and the patient.

The front wall 19 of the casing terminates short of the bottom wall 20 of the casing, as best shown in Figures 2 and 4, to provide a sight opening 9 at about the horizontal level of the patient's eyes. A mirror 21 is disposed in the bottom of the casing in rear of the sight opening and is sloped rearwardly at an angle of about 45 degrees relative to the bottom of the casing. The mirror may be held in place in any preferred manner as for example by a flange 22 carried by the front face of the rear wall and overlapping the mirror at the top edge. The mirror is held in place at the bottom by tabs 23 which project from the side walls and engage the lower corners of the mirror, as best shown in Figure 2.

The back wall 24 of the casing terminates short of the top wall 25 of the casing to provide a sight opening 26. A mirror 27 is disposed in the top of the casing in rear of the sight opening 26 and extends parallel to the mirror 21. The mirror is held in place by a flange 28 which projects from the rear face of the front wall of the casing and overlaps the bottom edge of the mirror. Tabs 29 project from the side walls of the casing and overlap the mirror near the upper corners, as best shown in Figure 3, to hold the mirror in place. The mirrors thus arranged in the casing provide a periscope when the casing is turned with the front wall 19 facing the patient.

The patient directs his line of vision 30, as shown in Figure 1, into the sight opening 9 at the lower end of the casing and views upon the mirror a distance chart 31 the image of which is reflected downwardly from the upper mirror 27. The top of the scopist's head is below the upper sight opening 26 in the rear wall of the mirror while making this test so that his line of vision will pass through his testing instrument 32, underneath the casing 12 when making a test of the patient's eyes. Without the patient moving and without the scopist changing his position he may rotate the casing on its vertical axis to turn the back wall 24 toward the patient for the purpose of making a different examination while the patient is reading a chart 33 displayed on the back of the casing.

For holding the chart 33 spring flanges 34 are disposed on the rear edges of the side walls of the casing and overlap the side edges of the chart. The flanges are open at the bottom so that the chart may be applied and removed from the bottom of the casing. Preferably the chart is provided with reading matter on one face and muscle measuring objects on the opposite face so that either face may be turned toward the patient in order to make the particular test desired.

In the modified form of the invention shown in Figures 6, 7 and 8, 35 designates the stationary supporting rod, 36 the rectangular casing, forming a combined periscope and chart holder, 37 the sleeve slidably mounted on the rod 36, 38 the hinge ears on the sleeve, 39 the hinge ears on the casing, 40 the hinge pintle, 41 and 42 the periscope mirrors, and 43 the spring flanges, these parts all being constructed identically the same as previously described in the description of the other form of the invention.

In the modified form of the invention the chart 33 previously described, is dispensed with and a disc chart 44, substituted therefor, the disc chart being preferably formed of metal and being swivelly mounted on a metal substantially square face plate 45 by a pivot pin 46 located at the center of the disc and at such a distance from the bottom of the face plate that a portion of the periphery of the disc will project below the bottom of the face plate to provide a grip for rotating the disc.

The disc is provided with vision testing characters and legends, the characters 47 being disposed in an annular series near the periphery of the disc and the legends 48 and the like being disposed in an annular series concentric with but inside of the outer series of characters. A sight opening 49 is formed in the face plate 45 above the pivot 46 to dispose the characters and a sight opening 50 is disposed in the face plate below the pivot 46 to dispose a legend associated with a selected character, as best shown in Figure 6.

The face plate 45 is slid underneath the spring retaining flanges 43 of the casing 36 so that the projecting portion of the disc 44 extends below the bottom of the casing.

In operation the scopist, without changing his position, may rotate the casing on the vertical axis 51 identical with the pin 16 previously described, to turn the rear of the casing toward the patient for the purpose of making an examination while the patient is reading the chart 44. Without changing his position the scopist may rotate the chart on the pivot pin 46 to expose various selected characters and legends through the sight openings 49 and 50 of the face plate 45.

In the modified form of the invention shown in Figures 9, 10 and 11 52 designates a stationary supporting rod, 53 the rectangular casing forming a combined periscope and chart holder, 54 the sleeve slidably mounted on the rod 52, 55 the hinge ears on the sleeve, 56 the hinge ears on the casing, 57 the hinge pintle, 58 and 59 the periscope mirrors and 60 and 61 the openings in the walls of the casing to expose the mirrors, these parts all being constructed identically the same as previously described in the description of the other forms of the invention.

In the modified form of the invention shown in Figures 6, 7 and 8, the card chart 33 and the disc chart 34 are dispensed with and a roller chart 62 is substituted therefor. The roller chart may be formed of any desired material and preferably is provided with four faces 63 arranged perpendicular to each other and adapted to be exposed through sight openings 64, 65 and 66 formed in the wall of the casing. The legends and characters on the faces may be of conventional type displayed by oculists' charts, or any other type.

The roller chart is mounted on a shaft 67 the ends of which are journaled in the sides of the casing. A knob 68 is fixed to one end of the shaft and forms a grip for turning the roller chart to display any predetermined legends or characters or both at the sight openings.

In all forms of the invention the charts afford a convenient and practical fixation object in line with the vision and prevent prismatic and aberration caused by looking diagonally through master and battery lenses.

Furthermore, it will be pointed out that by spacing the instrument at a distance from the patient's eye by means of the rods 10, 36 and 52 in the various forms of the invention, the operator may view the full wide open eye of the patient which is not the case in conventional forms of periscopes which are disposed at the patient's eye and permit only of the lower portion of the eye being seen by the operator.

From the above description it is thought that the construction and operation of the invention will be fully understood without further explanation.

What is claimed is:

Eye testing apparatus comprising a horizontally disposed rod, a lensed instrument extending downward from one end of the rod through which a patient may maintain vision in a direction along the length of the rod below the rod, a casing rotatively mounted on a vertical axis of rotation on the rod extending downward from the opposite end of the rod within said line of vision of the patient and above a line of vision of an operator sighted from in rear of and below the casing to the lensed instrument to permit the operator obtaining a view of the patient's eyes in natural condition back of the lensed instrument, inclined mirrors extending parallel with each other in the casing and exposed through respective openings in the casing to form a periscope when one side of the casing is turned toward the patient, and a chart carried by the casing and exposed to the line of vision of the patient when another side of the casing is turned toward the patient.

WALTER R. WILSON.